United States Patent
Bintz et al.

(10) Patent No.: US 10,415,465 B2
(45) Date of Patent: Sep. 17, 2019

(54) AXIAL COMPRESSOR WITH INTER-STAGE CENTRIFUGAL COMPRESSOR

(71) Applicant: United Technologies Corporation, Farmington, CT (US)

(72) Inventors: Matthew E Bintz, West Hartford, CT (US); Enzo DiBenedetto, Berlin, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 145 days.

(21) Appl. No.: 15/851,285

(22) Filed: Dec. 21, 2017

(65) Prior Publication Data
US 2019/0195127 A1  Jun. 27, 2019

(51) Int. Cl.
F02C 3/08 (2006.01)
F02C 7/28 (2006.01)
F02C 9/18 (2006.01)

(52) U.S. Cl.
CPC ............ F02C 3/08 (2013.01); F02C 7/28 (2013.01); F02C 9/18 (2013.01); F05D 2220/32 (2013.01)

(58) Field of Classification Search
CPC ...... F02C 3/08; F02C 7/28; F02C 9/18; F05D 2220/32
See application file for complete search history.

(56) References Cited

U.S. PATENT DOCUMENTS

| 2,618,433 | A | * | 11/1952 | Loos | F01D 5/081 384/100 |
| 2,910,268 | A | * | 10/1959 | Davies | F01D 5/06 415/115 |
| 2,988,325 | A | * | 6/1961 | Dawson | F01D 5/081 415/110 |
| 4,595,339 | A | * | 6/1986 | Naudet | F01D 5/048 415/115 |
| 4,901,520 | A | * | 2/1990 | Kozak | F02C 6/08 415/115 |
| 8,177,503 | B2 | * | 5/2012 | Bintz | F01D 5/087 415/208.1 |
| 2013/0251528 | A1 | * | 9/2013 | Roush | F04D 29/321 416/87 |
| 2016/0061215 | A1 | * | 3/2016 | Urac | F04D 29/321 415/144 |

\* cited by examiner

*Primary Examiner* — Igor Kershteyn
(74) *Attorney, Agent, or Firm* — Snell & Wilmer, L.L.P.

(57) ABSTRACT

An auxiliary compressor for a gas turbine engine is disclosed. The auxiliary compressor includes a first axial rotor, a second axial rotor positioned downstream of the first axial rotor, and a centrifugal impeller positioned intermediate the first axial rotor and the second axial rotor and operably coupled to the first axial rotor.

20 Claims, 5 Drawing Sheets

AXIAL COMPRESSOR WITH INTER-STAGE CENTRIFUGAL COMPRESSOR

GOVERNMENT LICENSE RIGHTS

This disclosure was made with government support under FA8650-15-D-2502/0002 awarded by the United States Air Force. The government has certain rights in the disclosure.

FIELD

The present disclosure relates to gas turbine engines and, more particularly, to gas turbine engines having centrifugal compressors configured to supply high pressure air to other sections or components of an engine.

BACKGROUND

Gas turbine engines typically include a compressor section, a combustor section and a turbine section. During operation, air is pressurized in the compressor section and mixed with fuel and burned in the combustor section to generate hot combustion gases. The hot combustion gases are communicated through the turbine section, which extracts energy from the hot combustion gases to power the compressor section and other gas turbine engine loads. Performance and efficiency improvements in gas turbine engine architectures are often accompanied by increases in compressor exit discharge temperatures, which are approaching the limits of material capabilities.

SUMMARY

A gas turbine engine is disclosed. The gas turbine engine includes a first axial rotor, a second axial rotor positioned adjacent the first axial rotor, and a centrifugal compressor positioned intermediate the first axial rotor and the second axial rotor and operably coupled to the first axial rotor. In various embodiments, the centrifugal compressor includes an impeller configured to rotate with the first axial rotor. In various embodiments, the first axial rotor includes a first rotor disk and the impeller is integral with the first rotor disk.

In various embodiments, the centrifugal compressor includes a housing positioned intermediate the first axial rotor and the second axial rotor and the housing encloses a diffuser and a collector. The centrifugal compressor may further include a plenum positioned radially outward of the collector and fluidly coupled to the collector by a first passageway. A vane may extend radially between the collector and the plenum. The first passageway may include an orifice extending through the vane.

In various embodiments, the gas turbine engine may further include a stationary structure configured to provide an outer boundary for a core flow of fluid, the stationary structure having a first port in fluid communication with the core flow of fluid, a first conduit configured to route a bleed portion of the core flow of fluid to a bore area of the gas turbine engine, and a joint positioned in the bore area of the gas turbine engine, between the first axial rotor and the second axial rotor, the joint having a slot configured to allow the bleed portion to flow from the bore area of the gas turbine engine, through the joint and to an inlet of the impeller.

In various embodiments, the gas turbine engine includes an inner boundary for a core flow of fluid and a first passageway extending through the inner boundary, the first passageway configured to route a bleed portion of the core flow of fluid to an impeller inlet. A second passageway may be positioned intermediate the first passageway and the inlet to the impeller, the second passageway bounded by the housing and by the second axial rotor. In various embodiments, the second passageway may adjoin the inlet to the impeller.

In various embodiments, the gas turbine engine includes a stationary structure configured to provide an outer boundary for a core flow of fluid, the stationary structure having a first port in fluid communication with the core flow of fluid, a first conduit configured to route a bleed portion of the core flow of fluid through an auxiliary passageway extending through the vane, through a second passageway bounded by the housing and the second axial rotor, and to the inlet of the impeller.

An auxiliary compressor for a gas turbine engine is disclosed. In various embodiments, the auxiliary compressor includes a first axial rotor, a second axial rotor positioned downstream of the first axial rotor, and a centrifugal impeller positioned intermediate the first axial rotor and the second axial rotor and operably coupled to the first axial rotor. In various embodiments, the first axial rotor includes a first rotor disk and the centrifugal impeller is integral with the first rotor disk. In various embodiments, a housing is positioned intermediate the first axial rotor and the second axial rotor and the housing encloses a diffuser and a collector in fluid communication with the centrifugal impeller. In various embodiments, a plenum is positioned radially outward of the collector and fluidly coupled to the collector by a first passageway. In various embodiments, a vane extends radially between the collector and the plenum and the first passageway comprises an orifice extending through the vane.

A gas turbine engine is disclosed. In various embodiments, the gas turbine engine includes a high pressure axial compressor having a first axial rotor and a second axial rotor positioned downstream of the first axial rotor and a centrifugal compressor positioned intermediate the first axial rotor and the second axial rotor and operably coupled to the first axial rotor. In various embodiments, the centrifugal compressor comprises an impeller configured to rotate with the first axial rotor. In various embodiments, the gas turbine engine further includes a stationary structure configured to provide an outer boundary for a core flow of fluid, the stationary structure having a port in fluid communication with the core flow of fluid, a conduit configured to route a bleed portion of the core flow of fluid to a bore area of the gas turbine engine, and a joint positioned in the bore area of the gas turbine engine, between the first axial rotor and the second axial rotor, the joint having a slot configured to allow the bleed portion to flow from the bore area of the gas turbine engine, through the joint and to an inlet of the impeller.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
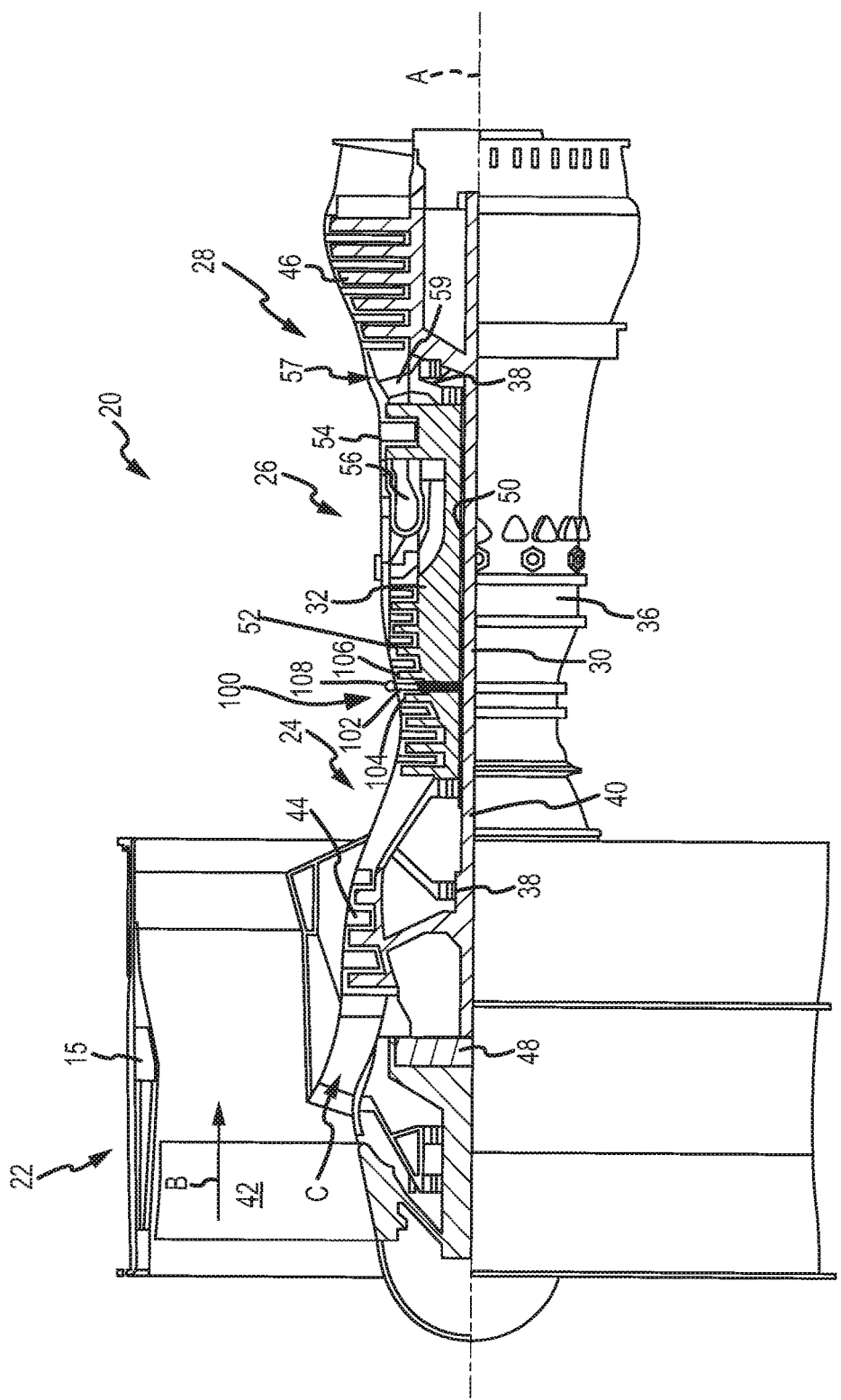
FIG. 1 is a schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core or primary flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans, as the teachings may be applied to other types of turbine engines.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of the bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a geared architecture such as a fan drive gear system 48 to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via the bearing systems 38 about the engine central longitudinal axis A, which is collinear with their longitudinal axes.

The core airflow is compressed by the low pressure compressor 44 and then the high pressure compressor 52, mixed and burned with fuel in the combustor 56, and then expanded over the high pressure turbine 54 and low pressure turbine 46. The mid-turbine frame 57 includes airfoils 59 that are in the core airflow path C. The low pressure turbine 46 and the high pressure turbine 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Gas turbine engines designs are seeking to increase overall efficiency by generating higher overall pressure ratios. By achieving higher overall pressure ratios, increased levels of performance and efficiency may be achieved. However, challenges are raised in that the parts and components associated with a high pressure compressor require additional cooling air as the overall pressure ratio increases. The gas turbine engine 20 utilizes a centrifugal compressor 100 for use in cooling downstream portions of the high pressure compressor 52 or other sections or components of the gas turbine engine 20. The centrifugal compressor 100 is positioned in a vane section 102, which is itself positioned downstream of a first rotor 104 and upstream of a second rotor 106. Air is bled from one or more locations of the high pressure compressor 52 and routed to the centrifugal compressor 100 where it is compressed to a higher pressure. In various embodiments, the compressed air is then routed through one or more of the vanes in the vane section 102 and then routed to a compressor exit or output 108, where the compressed air can be further routed to downstream portions of the high pressure compressor 52 or to other sections or components within the gas turbine engine 20.

Figure 2A:
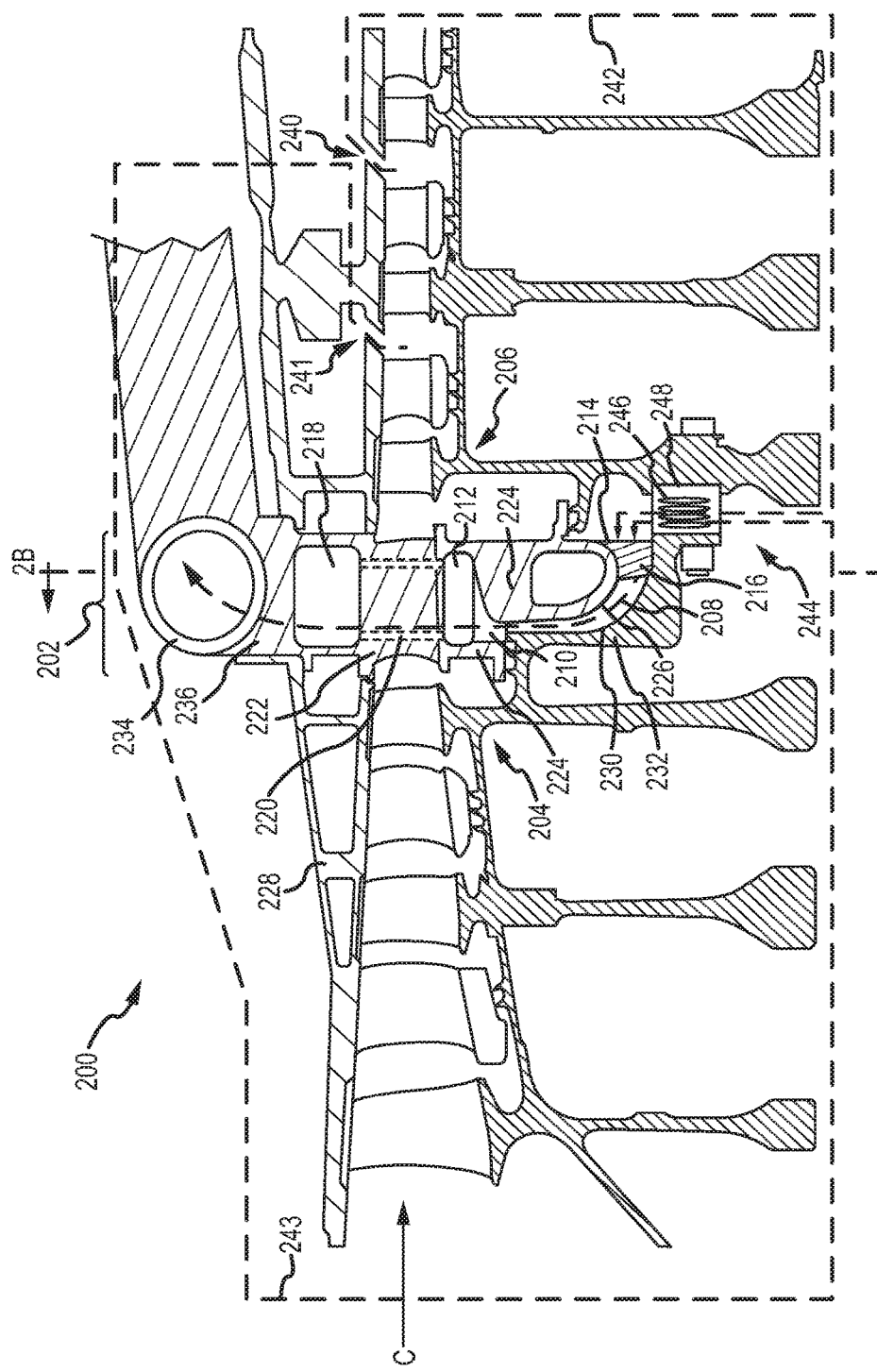
FIG. 2A is a schematic view of an axial compressor having a centrifugal compressor section, according to various embodiments.
Figure 2B:
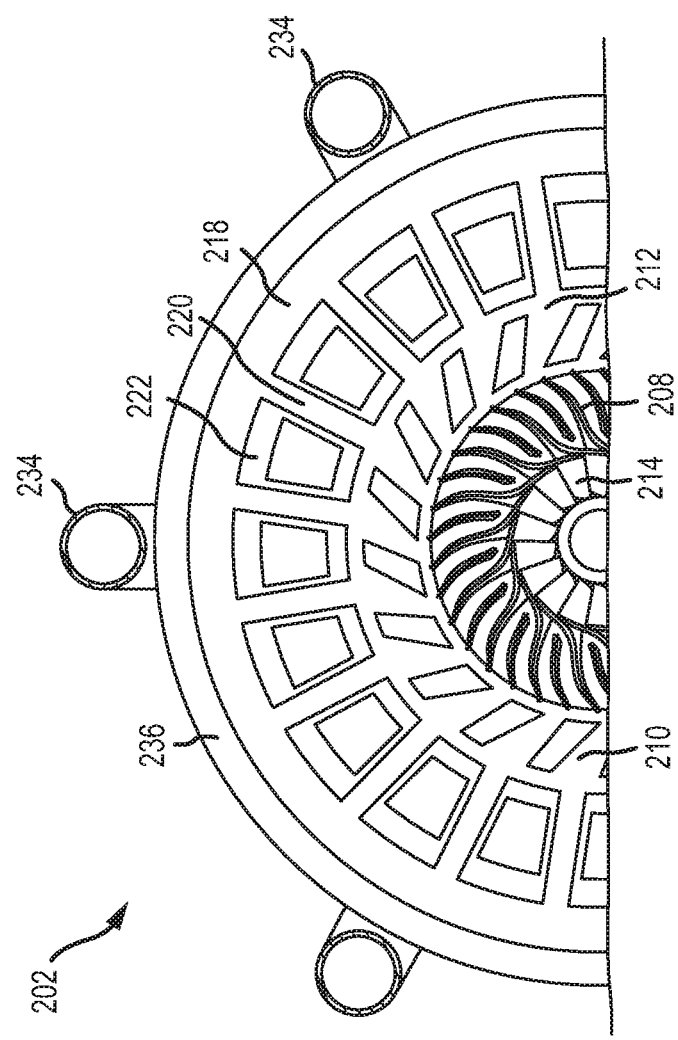
FIG. 2B is a schematic cross sectional view of the centrifugal compressor illustrated in FIG. 2A, according to various embodiments.

Referring now to FIGS. 2A and 2B, a section of a high pressure compressor 200 and a cross sectional view of a centrifugal compressor 202 incorporated into the high pressure compressor 200 are illustrated, according to various embodiments. The high pressure compressor 200 includes the centrifugal compressor 202 positioned between a first rotor 204 (or first axial rotor) and a second rotor 206 (or second axial rotor). The centrifugal compressor 202 includes an impeller 208, a diffuser 210 and a collector 212. An impeller inlet 214 provides an opening for air to pass into the impeller 208. Inlet guide vanes 216 may be used to precondition (e.g., to add swirl) the air passing through the impeller inlet 214 before reaching the impeller 208. A plenum 218 is positioned radially outward of the collector 212 and fluidly coupled to the collector 212 through one or more passageways 220. The passageways 220 extend through vanes 222 that are positioned intermediate the first rotor 204 and the second rotor 206. A housing 224 surrounds a radially outer side 226 (or axially downstream side) of the impeller 208 and both the diffuser 210 and the collector 212. The housing 224 is connected to the vanes 222, which are themselves connected to a stationary structure 228 that provides an outer boundary of the core flow path. The inlet guide vanes 216 are also connected to the housing 224. A radially inner side 230 (or axially upstream side) of the impeller 208 is affixed to or made integral with an impeller base 232, which may itself be connected to the first rotor 204 and the second rotor 206.

In various embodiments, the impeller 208 is incorporated into rotating disk structure, and the stationary portion of the centrifugal compressor 202, including the vanes 222 and the housing 224, is incorporated into or made integral with the radially inner portion of the stator vane assembly. Accordingly, in various embodiments, the rotor sections, including the first rotor 204 and the second rotor 206, of the high pressure compressor 200 are configured to rotate about a central axis in conventional fashion. The impeller base 232 rotates in unison with the first rotor 204 and the second rotor 206, thereby causing the causing the impeller 208 to rotate with respect to the housing 224, which surrounds and forms the diffuser 210 and the collector 212. The impeller 208, which rotates, and the housing 224, which is stationary and forms the diffuser 210 and the collector 212, provide the basic elements of the centrifugal compressor 202. Compressed air is fed from the collector 212 to the plenum 218 via the passageways 220. The compressed air is then fed to one or more exit pipes 234, which provide passageways for directing the compressed air to downstream portions of the high pressure compressor 200 or to other components of a gas turbine engine requiring cooling or a source of high pressure air. An outer casing 236 surrounds the plenum 218 and provides an inlet to the exit pipes 234.

In various embodiments, core air is bled from a first port 240 in fluid communication with the core flow path C and routed by a first conduit 242 into a bore area 244 of the interior of the high pressure compressor 200. The air is then fed through slots 246 positioned in a joint 248 used to attach the first rotor 204 to the second rotor 206. The air is then fed to the impeller inlet 214, compressed, and routed to the exit pipes 234. In various embodiments, the joint 248 is an annular member that extends circumferentially about a central axis of the high pressure compressor 200. In various embodiments, the first conduit may be routed through the frame structure or one or more struts of the gas turbine engine to reach the bore area 244. The first conduit 242 is illustrated running aft of the high pressure compressor 200. In various embodiments, core air is bled from a second port 241 in fluid communication with the core flow path C and routed by a second conduit 243 into the bore area 244 of the high pressure compressor 200. The second conduit 243 is illustrated running fore of the high pressure compressor 200 and, like the first conduit 242, may be routed through the frame structure or one or more struts of the gas turbine engine to reach the bore area 244. In various embodiments, pressure ratios of about 1.5 to about 2.0 with respect to the source pressure are possible from this arrangement.

Figure 3:
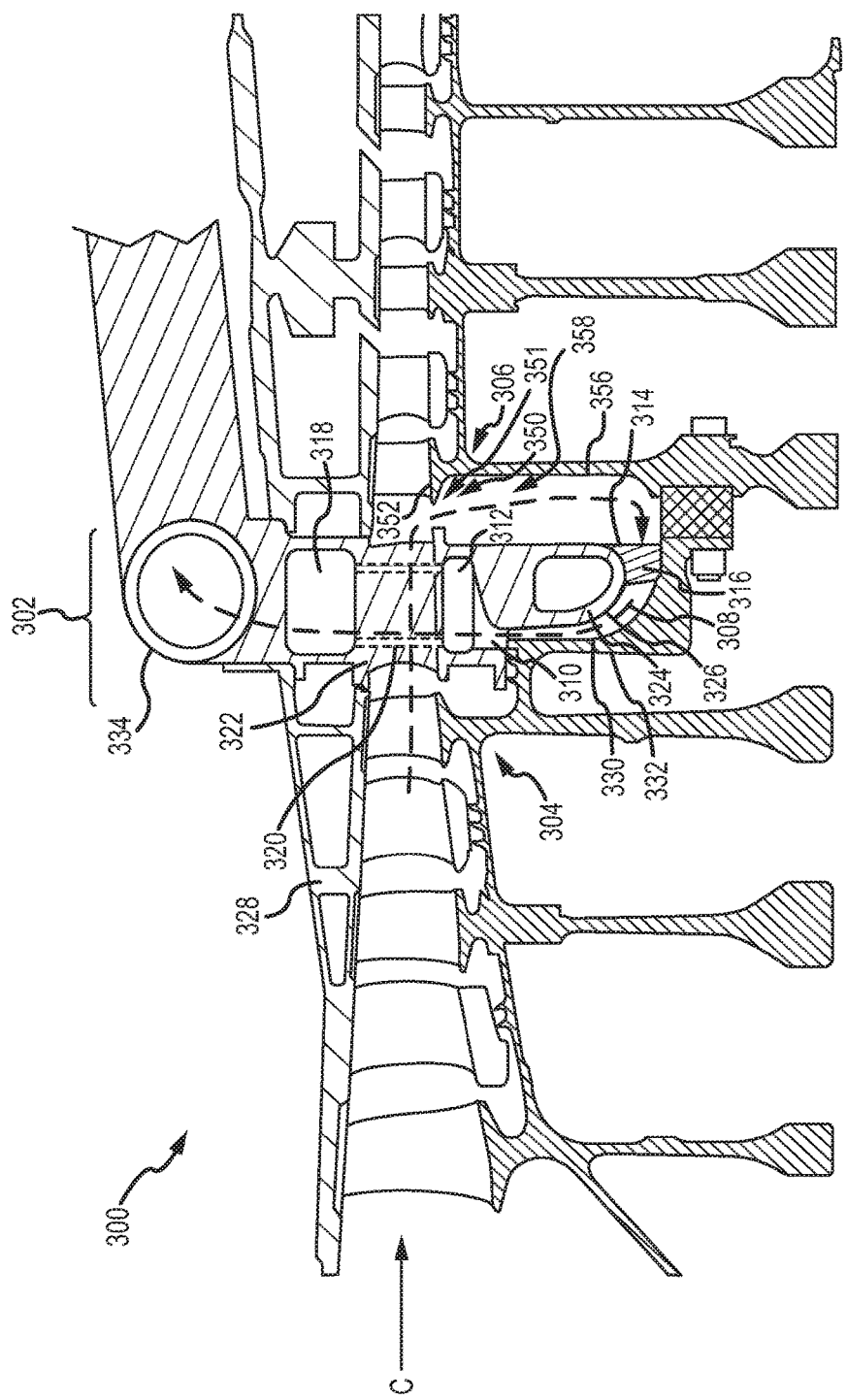
FIG. 3 is a schematic view of an axial compressor having a centrifugal compressor section, according to various embodiments.

Referring now to FIG. 3, a section of a high pressure compressor 300 having a centrifugal compressor 302 incorporated into the high pressure compressor 300 is illustrated, according to various embodiments. The high pressure compressor 300 includes the centrifugal compressor 302 positioned between a first rotor 304 (or first axial rotor) and a second rotor 306 (or second axial rotor). The centrifugal compressor 302 includes an impeller 308, a diffuser 310 and a collector 312. An impeller inlet 314 provides an opening for air to pass into the impeller 308. Inlet guide vanes 316 may be used to precondition the air passing through the impeller inlet 314 before reaching the impeller 308. A plenum 318 is positioned radially outward of the collector 312 and fluidly coupled to the collector 312 through one or more passageways 320. The passageways 320 extend through vanes 322 that are positioned intermediate the first rotor 304 and the second rotor 306. A housing 324 surrounds a radially outer side 326 of the impeller 308 and both the diffuser 310 and the collector 312. The housing 324 is fixedly connected to the vanes 322, which are themselves connected to a stationary structure 328 that provides an outer boundary of the core flow path. The inlet guide vanes 316 are also connected to the housing 324. A radially inner side of the impeller 330 is affixed to or made integral with an impeller base 332, which is itself connected to the first rotor 304 and the second rotor 306.

The centrifugal compressor 302 operates in a manner similar to that described above with respect to FIGS. 2A and 2B. In various embodiments, core air is bled from the core flow path C upstream from the second rotor 306. The core air is bled through a first passageway 350 positioned proximate a radially inner surface of the core flow path C. The first passageway 350 may be formed by one or more orifices extending through either the housing 324 or through an annular space 351 positioned between the housing 324 and the second rotor 306. In various embodiments, the core air is directed radially inward from the first passageway 350 and routed through a second passageway 358 bounded by an outer surface of the housing 324 and a surface of the second rotor 306. The air is then fed to the impeller inlet 314, compressed, and routed to exit pipes 334. The compressed air is subsequently routed to a downstream location of the high pressure compressor or to other components within a gas turbine engine. In various embodiments, the second passageway 358 adjoins the impeller inlet 314.

Figure 4:
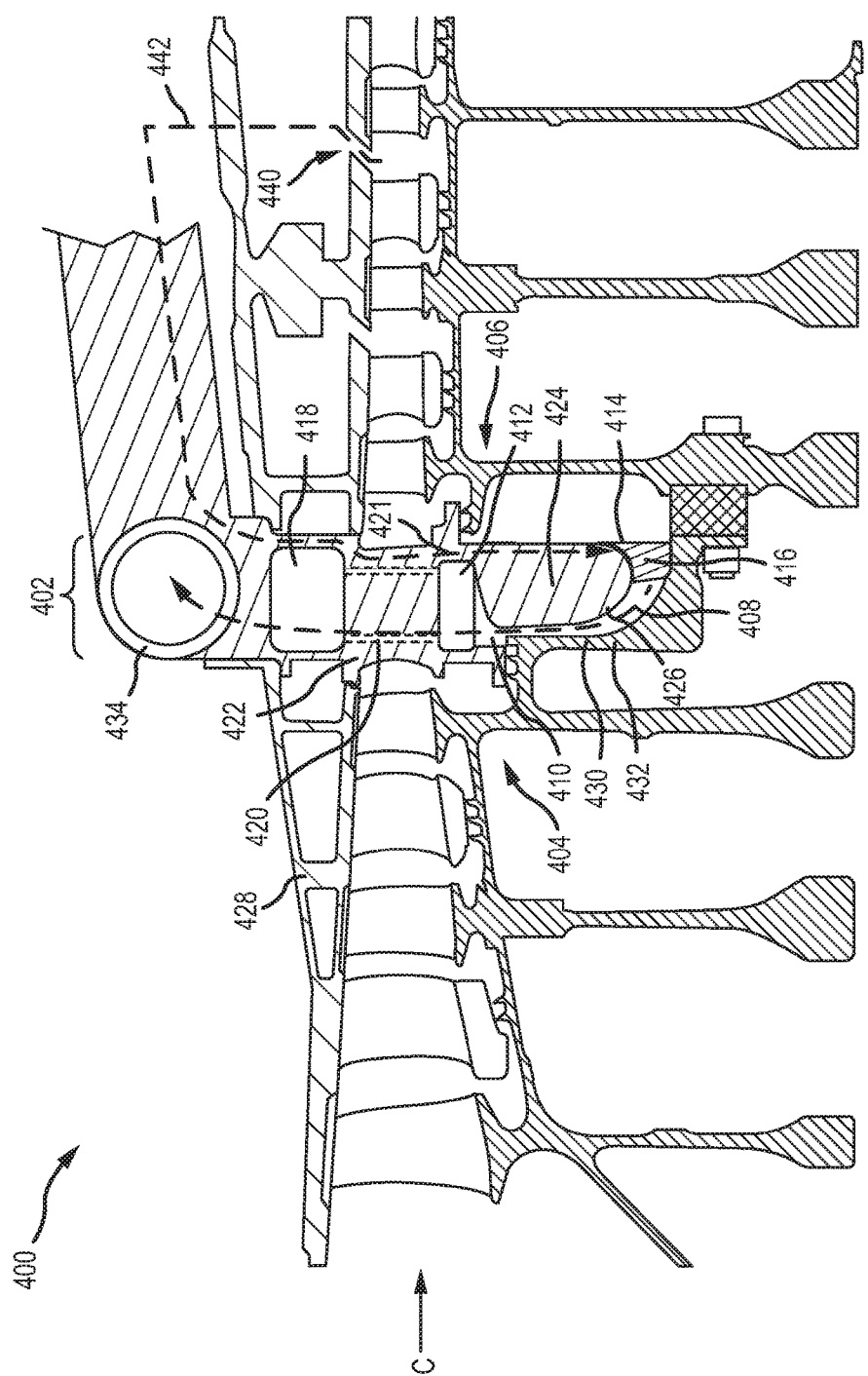
FIG. 4 is a schematic view of an axial compressor having a centrifugal compressor section, according to various embodiments.

Referring now to FIG. 4, a section of a high pressure compressor 400 having a centrifugal compressor 402 incorporated into the high pressure compressor 400 is illustrated, according to various embodiments. The high pressure compressor 400 includes the centrifugal compressor 402 positioned between a first rotor 404 (or first axial rotor) and a second rotor 406 (or second axial rotor). The centrifugal compressor 402 includes an impeller 408, a diffuser 410 and a collector 412. An impeller inlet 414 provides an opening for air to pass into the impeller 408. Inlet guide vanes 416 may be used to precondition the air passing through the impeller inlet 414 before reaching the impeller 408. A plenum 418 is positioned radially outward of the collector 412 and fluidly coupled to the collector 412 through one or more passageways 420. The passageways 420 extend through vanes 422 that are positioned intermediate the first rotor 404 and the second rotor 406. A housing 424 surrounds a radially outer side 426 of the impeller 408 and both the diffuser 410 and the collector 412. The housing 424 is fixedly connected to the vanes 422, which are themselves connected to a stationary structure 428 that provides an outer boundary of the core flow path. The inlet guide vanes 416 are also connected to the housing 424. A radially inner side of the impeller 430 is affixed to or made integral with an impeller base 432, which is itself connected to the first rotor 404 and the second rotor 406.

The centrifugal compressor 402 operates in a manner similar to that described above with respect to FIGS. 2A and 2B. In various embodiments, core air is bled from a first port 440 in fluid communication with the core flow path C and routed by a first conduit 442 through the housing 424 and past the plenum 418. The air may then be routed through one or more auxiliary passageways 421 in the vanes 422 and further routed through the housing 424. The auxiliary passageways 421 extending through the vanes 422 bypass fluid communication with the plenum 418, collector 412 and diffuser 410 and are configured to route core air through the vanes 422 and the housing 424. In various embodiments, the auxiliary passageways 421 may extend through the housing 424 to exit into the impeller inlet 414. The air is then compressed and routed to the exit pipes 434. The compressed air is then routed from the exit pipes 434 to a downstream location of the high pressure compressor 400 or to other components within a gas turbine engine.

The foregoing disclosure provides for a centrifugal compressor positioned within and between rotor stages of an axial compressor of a gas turbine engine. Various embodiments are disclosed that bleed core air from various locations. The temperature and pressure of the air input to the centrifugal compressor for further compression will differ depending on where the air was bled; typically the further downstream the air is bled, the higher will be the temperature and pressure. If required or beneficial, the air entering the centrifugal compressor or exiting therefrom may be intercooled, depending on the application intended or the operational requirements for the air exiting the compressor. Use of one or more intercoolers is contemplated with the disclosure provided herein.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A gas turbine engine, comprising:
   a first axial rotor;
   a second axial rotor positioned adjacent the first axial rotor; and
   a centrifugal compressor positioned axially intermediate the first axial rotor and the second axial rotor and operably coupled to the first axial rotor.

2. The gas turbine engine of claim 1, wherein the centrifugal compressor comprises an impeller configured to rotate with the first axial rotor.

3. The gas turbine engine of claim 2, wherein the first axial rotor includes a first rotor disk and wherein the impeller is integral with the first rotor disk.

4. The gas turbine engine of claim 2, wherein the centrifugal compressor further comprises a housing positioned intermediate the first axial rotor and the second axial rotor and wherein the housing encloses a diffuser and a collector.

5. The gas turbine engine of claim 4, wherein the centrifugal compressor further comprises a plenum positioned radially outward of the collector and fluidly coupled to the collector by a first passageway.

6. The gas turbine engine of claim 5, further comprising a vane extending radially between the collector and the plenum.

7. The gas turbine engine of claim 6, wherein the first passageway comprises an orifice extending through the vane.

8. The gas turbine engine of claim 2, further comprising
   a stationary structure configured to provide an outer boundary for a core flow of fluid, the stationary structure having a first port in fluid communication with the core flow of fluid,
   a first conduit configured to route a bleed portion of the core flow of fluid to a bore area of the gas turbine engine, and
   a joint positioned in the bore area of the gas turbine engine, between the first axial rotor and the second axial rotor, the joint having a slot configured to allow the bleed portion to flow from the bore area of the gas turbine engine, through the joint and to an inlet of the impeller.

9. The gas turbine engine of claim 2, further comprising an inner boundary for a core flow of fluid and a first passageway extending through the inner boundary, the first passageway configured to route a bleed portion of the core flow of fluid to an inlet to the impeller.

10. The gas turbine engine of claim 9, further comprising a second passageway positioned intermediate the first passageway and the inlet to the impeller, the second passageway bounded by a housing enclosing the centrifugal compressor and by the second axial rotor.

11. The gas turbine engine of claim 10, wherein the second passageway adjoins the inlet to the impeller.

12. The gas turbine engine of claim 6, further comprising
a stationary structure configured to provide an outer boundary for a core flow of fluid, the stationary structure having a first port in fluid communication with the core flow of fluid,
a first conduit configured to route a bleed portion of the core flow of fluid through an auxiliary passageway extending through the vane, through a second passageway bounded by the housing and the second axial rotor, and to an inlet of the impeller.

13. An auxiliary compressor for a gas turbine engine, comprising:
a first axial rotor;
a second axial rotor positioned downstream of the first axial rotor; and
a centrifugal impeller positioned intermediate the first axial rotor and the second axial rotor and operably coupled to the first axial rotor.

14. The auxiliary compressor of claim 13, wherein the first axial rotor includes a first rotor disk and wherein the centrifugal impeller is integral with the first rotor disk.

15. The auxiliary compressor of claim 14, further comprising a housing positioned intermediate the first axial rotor and the second axial rotor and wherein the housing encloses a diffuser and a collector in fluid communication with the centrifugal impeller.

16. The auxiliary compressor of claim 15, further comprising a plenum positioned radially outward of the collector and fluidly coupled to the collector by a first passageway.

17. The auxiliary compressor of claim 16, further comprising a vane extending radially between the collector and the plenum and wherein the first passageway comprises an orifice extending through the vane.

18. A gas turbine engine, comprising:
a high pressure axial compressor having a first axial rotor and a second axial rotor positioned downstream of the first axial rotor; and
a centrifugal compressor positioned intermediate the first axial rotor and the second axial rotor and operably coupled to the first axial rotor.

19. The gas turbine engine of claim 18, wherein the centrifugal compressor comprises an impeller configured to rotate with the first axial rotor.

20. The gas turbine engine of claim 19, further comprising
a stationary structure configured to provide an outer boundary for a core flow of fluid, the stationary structure having a port in fluid communication with the core flow of fluid,
a conduit configured to route a bleed portion of the core flow of fluid to a bore area of the gas turbine engine, and
a joint positioned in the bore area of the gas turbine engine, between the first axial rotor and the second axial rotor, the joint having a slot configured to allow the bleed portion to flow from the bore area of the gas turbine engine, through the joint and to an inlet of the impeller.

* * * * *